United States Patent
Glavak et al.

(10) Patent No.: US 12,398,802 B2
(45) Date of Patent: Aug. 26, 2025

(54) FLEXIBLE PUMP ASSEMBLY FOR USE IN A FAN DRIVE

(71) Applicant: Robert Bosch GmbH, Stuttgart (DE)

(72) Inventors: Alex Glavak, Neu-Ulm (DE); Benjamin Rosenbaum, Arnsberg (DE); Joerg Spang, Neu-Ulm (DE); Ulrich Schill, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/936,008

(22) Filed: Nov. 4, 2024

(65) Prior Publication Data
US 2025/0146495 A1  May 8, 2025

(30) Foreign Application Priority Data
Nov. 6, 2023 (DE) ..................... 10 2023 210 958.1

(51) Int. Cl.
*F16H 61/4008* (2010.01)
*B60K 25/00* (2006.01)
(Continued)

(52) U.S. Cl.
CPC ......... *F16H 61/4008* (2013.01); *B60K 25/00* (2013.01); *F04B 1/295* (2013.01);
(Continued)

(58) Field of Classification Search
CPC ... F16H 61/4008; F16H 61/431; B60K 25/00; F04B 1/295; F04B 1/324; F04B 49/002; F04B 49/08; F04B 49/22; F04B 49/225
See application file for complete search history.

(56) References Cited

U.S. PATENT DOCUMENTS 5,170,625 A * 12/1992 Watanabe ............. F04B 49/065
91/511
8,176,734 B2 * 5/2012 Throckmorton .... F16H 61/4017
60/452
(Continued)

FOREIGN PATENT DOCUMENTS

| DE | 10 2010 020 528 A1 | 11/2011 |
| DE | 10 2019 210 003 A1 | 1/2021 |
| DE | 10 2021 200 693 A1 | 7/2022 |

OTHER PUBLICATIONS

"Axial Piston Variable Pump A4VG Series 35", Data sheet RE92035, Feb. 12, 2020, Bosch Rexroth AG, Elchingen, Germany (34 pages).
(Continued)

*Primary Examiner* — Mary A Davis
(74) *Attorney, Agent, or Firm* — Maginot, Moore & Beck LLP

(57) ABSTRACT

A pump assembly has a displacement volume that is continuously adjustable by a double-acting control cylinder having first and second control chambers, to which first and second receiving bores, respectively, are assigned. A pressure control valve in the form of a built-in valve is installed in one of the receiving bores and a 3/2-way switching valve in the form of a built-in valve is installed in the other of the receiving bores. The pressure control valve and the 3/2-way switching valve are each electrically adjustable and are connected to a control device. A target conveying pressure difference can be specified to the control device, and the control device is configured such that, by controlling the pressure control valve and the 3/2-way switching valve, the control device adjusts the displacement volume so that the difference between the first and second actual pressures approaches the target conveying pressure difference.

11 Claims, 6 Drawing Sheets

(51) Int. Cl.
  *F04B 1/295* (2020.01)
  *F04B 1/324* (2020.01)
  *F04B 49/00* (2006.01)
  *F04B 49/08* (2006.01)
  *F04B 49/22* (2006.01)
  *F16H 61/431* (2010.01)

(52) U.S. Cl.
  CPC ............ *F04B 1/324* (2013.01); *F04B 49/002* (2013.01); *F04B 49/08* (2013.01); *F04B 49/22* (2013.01); *F04B 49/225* (2013.01); *F16H 61/431* (2013.01)

(56) References Cited

U.S. PATENT DOCUMENTS

2008/0145239 A1* 6/2008 Murase ................. F04B 39/123
  417/222.2
2014/0060034 A1* 3/2014 Du .......................... F04B 35/04
  60/459
2025/0146515 A1* 5/2025 Glavak .................. F04B 1/324

OTHER PUBLICATIONS

"Axialkolben-Verstellpumpe A4VG Baureihe 35", Data sheet RD92035, Feb. 12, 2020, Bosch Rexroth AG, Elchingen, Germany (34 pages).
"Proportional Pressure Reducing Valve, Direct Operated, Increasing Characteristic Curve FTDRE 4 K", Data sheet RE58038, Feb. 2, 2022, Bosch Rexroth AG, Elchingen, Germany (10 pages).
"Proportional-Druckreduzierventil, direktgesteuert, steigende Kennlinie FTDRE 4 K", Data sheet RD58038, Feb. 2, 2022, Bosch Rexroth AG, Elchingen, Germany (10 pages).

\* cited by examiner

FLEXIBLE PUMP ASSEMBLY FOR USE IN A FAN DRIVE

This application claims priority under 35 U.S.C. § 119 to application no. DE 10 2023 210 958.1, filed on Nov. 6, 2023 in Germany, the disclosure of which is incorporated herein by reference in its entirety.

The disclosure relates to a pump assembly.

BACKGROUND

From the data sheet "Axialkolben-Verstellpumpe A4VG Baureihe 35" of Bosch Rexroth AG (order number RD92035; edition Feb. 12, 2020), a pump assembly in the form of an axial piston machine in a swashplate design is known, the displacement volume of which is adjustable across zero by means of a double-acting control cylinder, so that, while the drive rotation direction is kept the same, the conveying direction can be reversed merely by adjustment of the swashplate. For the ET adjustment, the two control chambers of the control cylinder are connected to one pressure control valve each, in the form of a pressure reducing valve. In the event of failure of the electric control, it is not clear what displacement volume is set, or the displacement volume of zero is set.

This behavior is undesirable in hydraulic fan drives. There, the fan is usually to rotate at maximum speed if the electric control fails (fail-safe behavior).

DE 10 2010 020 528 A1 shows a fan drive having a closed hydraulic circuit essentially comprising the axial piston machine discussed above. Here, the control cylinder is controlled by means of a pressure control valve in the form of a pressure reducing valve with rising or positive characteristic curve and by means of a 4/2-way switching valve, the two control valves being electrically adjustable. The circuit is designed such that, in the event of failure of the electric control, the axial piston machine automatically sets a displacement volume of maximum magnitude, so that the two fan wheels rotate at maximum speed.

Furthermore, the circuit is designed such that the current at the pressure control valve does not need to be adjusted abruptly in the event of a zero crossing of the control pressure difference. During the zero crossing, the corresponding control current drops to zero and then rises again, and only the 4/2-way switching valve is switched over abruptly.

The disadvantage of this control is that a special valve block especially adapted to the fan drive is required for the control valves. If different behavior is desired instead of the aforementioned fail-safe behavior, the valve block must be modified.

SUMMARY

An advantage of the disclosed pump assembly is that, merely with control valves available from the catalog, the known axial piston machine can be designed such that the aforementioned fail-safe behavior is achieved. At the same time, a large number of drive variants can be implemented by means of the appropriate choice of the direction of control and of the mounting location of the two control valves, without mechanical special designs being required over catalog components which are already known. It is merely required that the program of the control device or the variable settings of said program are adapted to the control valves chosen for use.

According to the disclosure, it is proposed that a pressure control valve in the form of a built-in valve is installed in the one, first or second, receiving bore, wherein a 3/2-way switching valve in the form of a built-in valve is installed in the other, second or first, receiving bore, wherein the pressure control valve and the 3/2-way switching valve are each electrically adjustable, wherein they are each connected to the control device, wherein a target conveying pressure difference can be specified to the control device, wherein the control device is configured such that, by controlling the pressure control valve and the 3/2-way switching valve, said control device adjusts the displacement volume in such a way that the difference between the first and second actual pressures approaches the target conveying pressure difference.

The pump assembly is preferably operated with a pressurized fluid, which is most preferably a liquid and in particular hydraulic oil. The pump assembly preferably comprises an axial piston machine in a swashplate design, in which the swashplate is pivotable with respect to a pivot axis by means of the control cylinder, wherein the swashplate is coupled, with respect to motion, to a control piston of the control cylinder, wherein the control piston delimits the first and second control chambers. The pivot axis intersects the axis of rotation of the drive shaft preferably at a right angle. The two kidney-shaped control ports of the axial piston machine are preferably mirror symmetrical to each other and mirror symmetrical with respect to a plane containing the axis of rotation and containing the pivot axis. The hydraulically effective surfaces of the first and second control chambers are preferably equal in size. Each of the at least one hydraulic motor preferably has a drive connection, most preferably a direct drive connection, to an associated fan wheel. The first and the second receiving bores can each be provided with an internal thread, into which the pressure control valve or the 3/2-way switching valve can be screwed, wherein the two internal threads are of the same design, in particular with regard to the thread diameter and the thread pitch. The pressure control valve and/or the 3/2-way switching valve is preferably each electrically adjustable by means of an actuation solenoid. The pressure control valve is preferably in the form of a pressure reducing valve. The first and/or the second receiving bore is preferably arranged on a housing of the pump assembly.

It may be provided that, in the control device, it is possible to set which of the two receiving bores, namely the first and second receiving bores, each of the pressure control valve and the 3/2-way switching valve are installed in, the control device being configured such that this setting is considered in the controlling of the pressure control valve and in the controlling of the 3/2-way switching valve. The mentioned consideration takes place preferably in the context of the case differentiation and in the context of the calculation of the individual cases, namely the zero case, the positive case and the negative case, the mentioned consideration taking place most preferably only there. This is possible because, in the calculation process explained with reference to FIGS. 2 and 3, the target control pressure difference is used as an intermediate value, the target control pressure difference being independent of the adjustable equipping with control valves.

A speed sensor may be provided, by means of which an actual speed of the drive shaft can be measured, the control device being configured such that, in the controlling of the pressure control valve and in the controlling of the 3/2-way switching valve, only the actual speed and the first and second actual pressures are considered as actual values measured during operation. This particularly inexpensive sensor equipping is possible, inter alia, because the target conveying pressure difference is specified as a reference variable to the control device.

It may be provided that the control device implements feed-forward control on which closed-loop control is superposed. Thus, on the one hand, the pump assembly reacts quickly to changes in the target conveying pressure difference, while nevertheless the target conveying pressure difference is very accurately reached.

It may be provided that, in the control device, it is possible to set whether the pressure control valve actually used has a rising or a falling characteristic curve, the control device being configured such that this setting is considered in the controlling of the pressure control valve. In the case of a rising characteristic curve or a positive characteristic curve, the pressure at the outlet of the pressure control valve increases approximately proportionally to the current in the actuation solenoid. In the case of a falling characteristic curve or a negative characteristic curve, the relationship is approximately inversely proportional. The mentioned consideration takes place preferably in the context of the inverse model of the pressure control valve, the mentioned consideration taking place most preferably only there. The inverse model of the pressure control valve is preferably selected according to the mentioned setting. This is possible because, in the calculation process explained with reference to FIGS. 2 and 3, the first and second control pressures are used as intermediate values, the first and second control pressures being independent of the characteristic curve of the pressure control valve.

It may be provided that the 3/2-way switching valve is biased into a first position by means of a restoring spring, said 3/2-way switching valve being able to be switched into a second position by means of an associated actuation solenoid, the relevant first or second control chamber being able to be fluidically connected selectively either to a control supply or to a control return by switching of the 3/2-way switching valve, it being possible to set, in the control device, whether the 3/2-way switching valve actually used establishes a fluidic connection between the associated control chamber, namely the first or the second control chamber, and the control supply or the control return when said 3/2-way switching valve is in the first position, and the control device being configured such that this setting is considered in the controlling of the 3/2-way switching valve. The mentioned consideration takes place preferably in the context of the inverse model of the 3/2-way switching valve, the mentioned consideration taking place most preferably only there. The inverse model of the 3/2-way switching valve is preferably selected according to the mentioned setting. This is possible because, in the calculation process explained with reference to FIGS. 2 and 3, the first and second control pressures are used as intermediate values, the first and second control pressures being independent of the switching function of the 3/2-way switching valve.

It may be provided that the pressure control valve has a rising characteristic curve, the 3/2-way switching valve establishing a connection to a control supply when said 3/2-way switching valve is in the first position. This is one possibility for achieving the aforementioned fail-safe behavior of a fan drive.

It may be provided that the pressure control valve has a falling characteristic curve, the 3/2-way switching valve establishing a connection to a control return when said 3/2-way switching valve is in the first position. This is another possibility for achieving the aforementioned fail-safe behavior of a fan drive.

A feed pump may be provided, which has a drive connection to the drive shaft, said feed pump being fluidically connected, on the outlet side, to the control supply, a feed pressure limiting valve being provided, by means of which a pressure in the control supply can be set, and the control device being configured such that the setting of the feed pressure limiting valve is considered in the controlling of the pressure control valve and in the controlling of the 3/2-way switching valve. The feed pressure limiting valve may be firmly set, for example by means of a countered setting screw, this setting being considered in the form of an adjustable parameter in the control device. The feed pressure limiting valve may be electrically adjustable by means of an actuation solenoid, said actuation solenoid being connected to the control device, and the control device considering the setting of the feed pressure limiting valve actually electrically made. The mentioned consideration takes place preferably in the context of the inverse model of the pressure control valve and in the context of the inverse model of the 3/2-way switching valve, the mentioned consideration taking place most preferably only there.

It may be provided that the first and/or the second control chamber is permanently fluidically connected to the associated first or second receiving bore via a respectively associated first or second throttle. By means of the first and second throttles, the rate at which the displacement volume is adjusted can be reliably capped in order to protect the hydraulic motor and the fan from damage. The first and/or the second throttle preferably each has a fixed flow resistance. Said throttle is preferably in the form of a separate insert which can be fastened, in particular screwed, in a fluid channel in the housing of the pump assembly.

It may be provided that the displacement volume is continuously adjustable such that a direction of the fluid flow between the first and second working ports can be reversed, while the rotation direction of the drive shaft remains constant, merely by adjustment of the control cylinder. The pump assembly according to the data sheet mentioned above has this operating behavior. In the context of the present disclosure, this may be utilized to reverse the conveying direction in the currentless state by exchanging the pressure control valve and the 3/2-way switching valve, the associated setting being adapted accordingly in the control device.

Of course, the above-mentioned features and those to be explained below can be used not only in the combination indicated in each case, but also in other combinations or on their own, without going beyond the scope of the present disclosure.

BRIEF DESCRIPTION OF THE DRAWINGS

The disclosure is explained in more detail below with reference to the enclosed drawings. The figures show.

DETAILED DESCRIPTION

Figure 1:
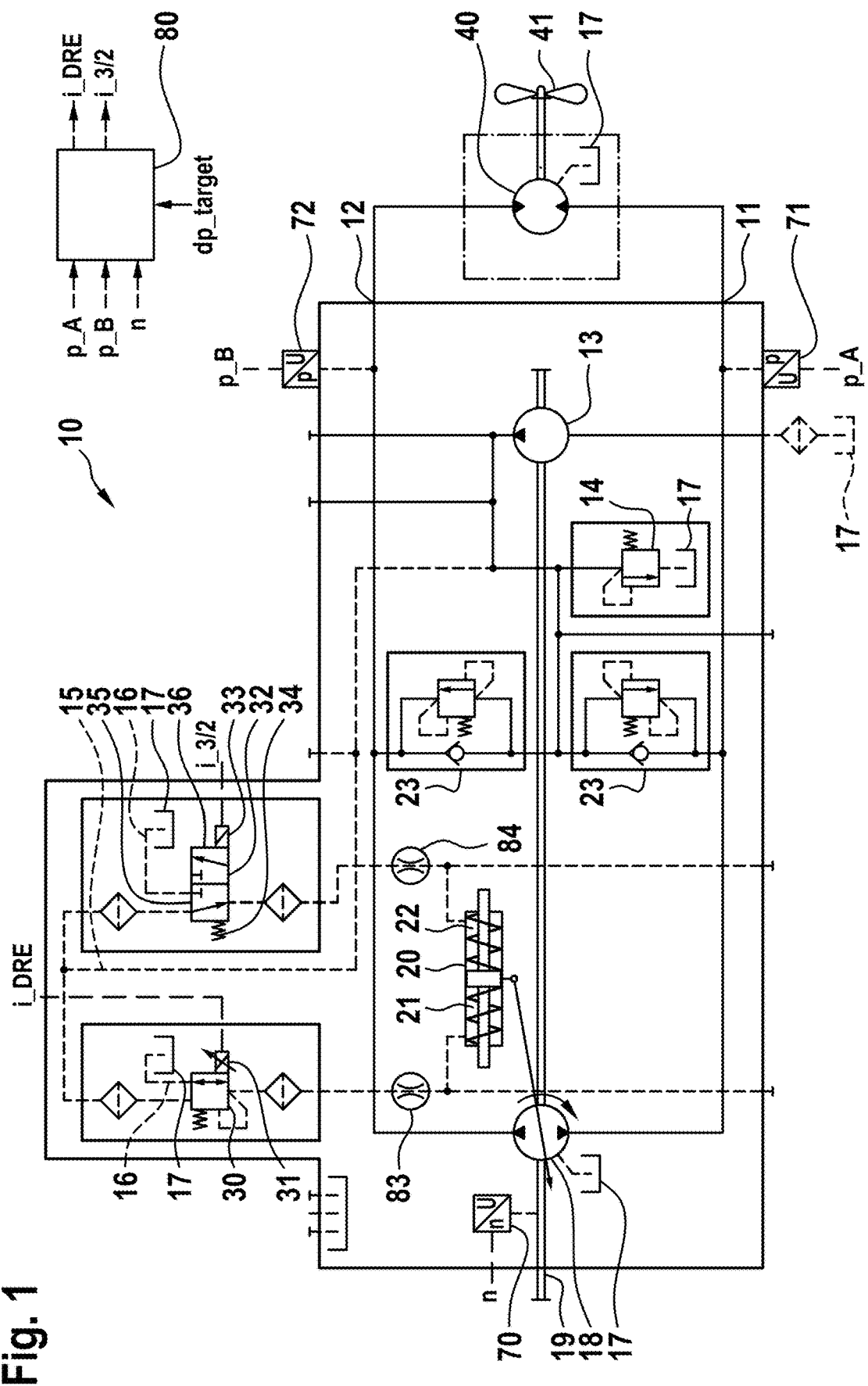
FIG. 1 a hydraulic circuit diagram of a pump assembly according to the disclosure.

FIG. 1 shows a hydraulic circuit diagram of a pump assembly 10 according to the disclosure. The pump assembly 10 comprises a main pump 18 and a feed pump 13, which are driven by a common drive shaft 19. The actual speed n of the drive shaft 19 may be measured by a speed sensor 70, which is preferably fixedly attached to the pump assembly 10.

The main pump 18 is configured in an axial piston design, wherein its displacement volume is preferably continuously adjustable by means of a pivotable swashplate. The swashplate is coupled, with respect to motion, to the control piston of a double-acting control cylinder 20. The control cylinder 20 has a first and a second control chamber 21; 22, wherein the pressures there, the numerical values of which correspond to p_DRE; p_3/2 in FIG. 3, act on the control piston in opposite directions. The first control chamber 21 is fluidically connected directly to a pressure control valve 30, which is preferably in the form of a pressure reducing valve, said pressure control valve being electrically adjustable by means of an actuation solenoid 31. The second control chamber 22 is fluidically connected directly to a 3/2-way switching valve 32, which is electrically adjustable by means of an actuation solenoid 33, said 3/2-way switching valve being biased by means of a restoring spring 34 into a position in which the control supply 15 is connected through (so-called open position). The pressure control valve 30 and/or the 3/2-way switching valve 32 is preferably each controlled by means of a pulse-width-modulated voltage, the duty cycle of which is selected such that, on average over time, a current results, the numerical value of which corresponds to i_DRE or i_3/2, respectively. For this purpose, preferably in each case a digitally implemented current control loop is used, which is most preferably calculated by the control device 80.

In the present case, the pressure control valve 30 has a positive or rising characteristic curve, such that, in its currentless state, the low pressure in the control return 16 is present in the first control chamber 21. The 3/2-way switching valve 32 is normally open, so that in its currentless state the high pressure in the control supply 15 is present in the second control chamber 22. The present main pump 18 is adjustable across the displacement volume of zero. Accordingly, in the currentless state, a displacement volume of maximum magnitude is set, so long as the drive shaft 19 rotates. The corresponding rotation direction is configured such that the fan wheel 41 rotates according to the desired cooling air conveying direction. This behavior is desired in the vast majority of cases of fan drives, so that the internal combustion engine to be cooled is sufficiently cooled even in the event of a failure of the electric control.

The feed pump 13 may be in the form of a rotary vane pump, for example. It draws pressurized fluid from a tank 17 and conveys it into the control supply 15 and, via the feed valves 23, also into the closed hydraulic circuit. In FIG. 1, all tank symbols 17 refer to the same tank. The pressurized fluid is preferably a liquid and most preferably hydraulic oil. The output of the feed pump 13 is connected to a feed pressure limiting valve 14. During most of the operating time of the pump assembly 10, the delivery flow of the feed pump 13 is high enough that the feed pressure limiting valve 14 is triggered, so that the pressure in the control supply 15 is defined by the setting of the feed pressure limiting valve 14. In the present case the feed pressure limiting valve 14 is fixed, although an electrically adjustable feed pressure limiting valve (see FIG. 5) can be used.

In the present case, the first and second working ports 11; 12 of the main pump 18 and of the pump assembly 10 are fluidically connected to a hydraulic motor 40 in the sense of a closed hydraulic circuit. The hydraulic motor 40 drives a fan wheel 41 directly, which, for example, cools the cooling circuit of an internal combustion engine of a relatively large vehicle, in particular a mobile work machine. The present disclosure is intended primarily for this application, although of course it can also be used for other applications. The target conveying pressure difference explained below can be used as a control variable, for example in a superposed control loop by means of which the speed of the fan wheel 41 is controlled. In this context, preferably only the first and second pressure sensors 71; 72 and speed sensor 70 are to be used; no other sensors are absolutely necessary. Of course, for example a pivot angle sensor may be optionally used on the main pump 18 or another speed sensor may be optionally used on the hydraulic motor 40 to improve the operating behavior of the overall system.

With the first pressure sensor 71, a first actual pressure p_A can be measured at the first working port 11. With the second pressure sensor 72, a second actual pressure p_B can be measured at the second working port 12.

Reference should be made to the two feed valves 23, via which pressurized fluid can be conveyed from the feed pump 13 into the closed hydraulic circuit to compensate for leakages. It is conceivable to equip the pump assembly 10 with a purge valve by which, in addition to said leakages, pressurized fluid can be drawn from the closed hydraulic circuit in a controlled way so that the pressurized fluid there does not overheat. However, this hazard is low in the case of the present fan drive.

The pump assembly 10 comprises a control device 80, which preferably comprises a programmable digital computer, in particular a microprocessor and/or an FPGA. The first and second pressure sensors 71; 72 and the speed sensor 70 are connected to the input side of the control device 80, so that the first and second actual pressures p_A; p_B and the actual speed n are available in the control device 80 for the calculation of the first and second control currents i_DRE; i_3/2. The actuation solenoids 31; 33 of the pressure control valve 30 and of the 3/2-way switching valve 32 are connected to the output side of the control device 80.

Reference should also be made to the first and second throttles 83; 84, each of which is connected between the first or the second control chamber 21; 22, respectively, and the associated control valve 30; 32. By means of the first and second throttles 83; 84, the rate at which the displacement volume is adjusted can be reliably capped in order to protect the hydraulic motor 40 and the fan 41 from damage.

Figure 2:
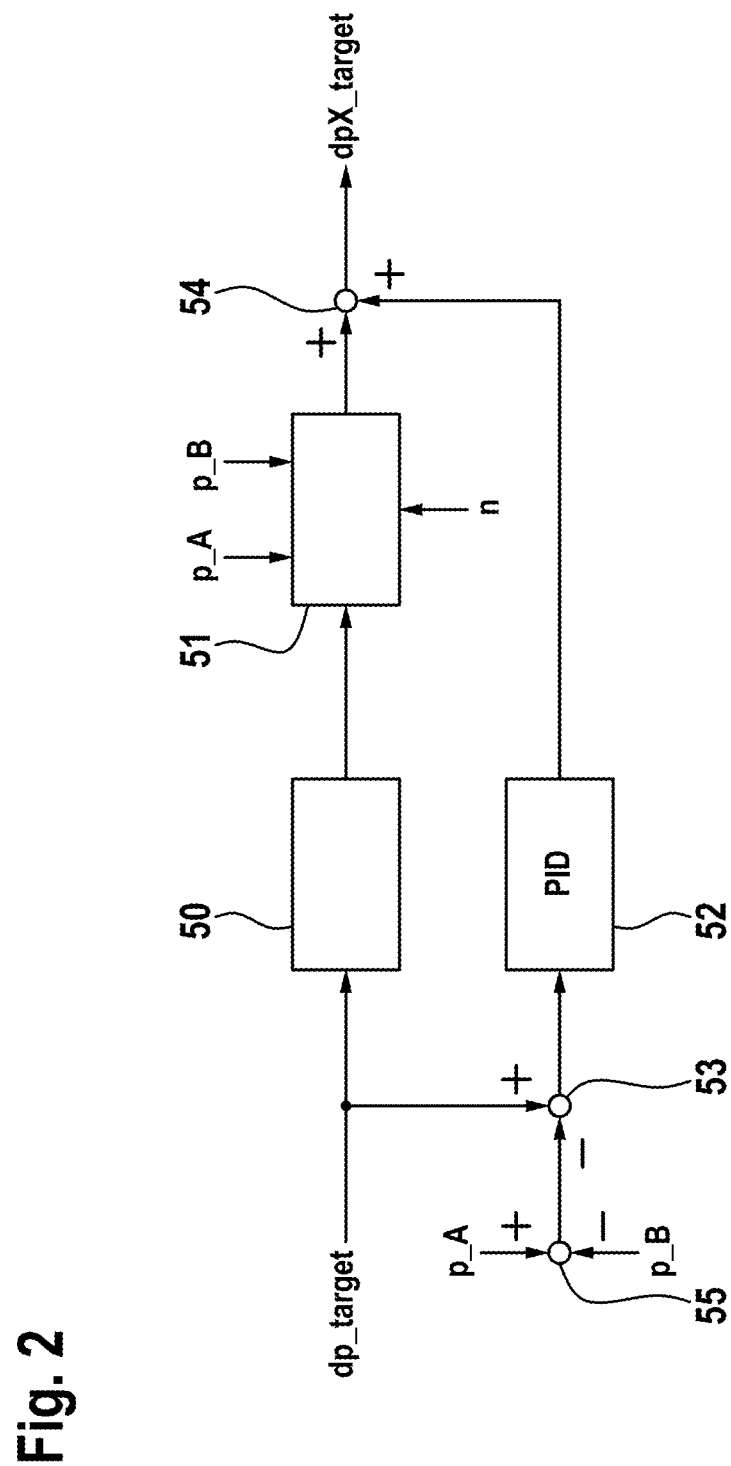
FIG. 2 a part of a control diagram implementing the method according to the disclosure.

FIG. 2 shows a part of a control diagram implementing the method according to the disclosure. The part of the control diagram shown in FIG. 2 may be subject to significant variations without departing from the scope of the present disclosure. For example, the feed-forward control with the trajectory planning filter 50 and with the inverse model 51 of the pump assembly may be used alone. It is also conceivable that the controller 52 is used alone. In any case, a functionally capable overall system is provided; FIG. 2 shows the most complex variant with the best operating properties.

A target conveying pressure difference dp_target is specified to the pump assembly from the outside, wherein the difference between the first and second actual pressures p_A; p_B measured by means of the first pressure sensor and the second pressure sensor, respectively, is to be set to the target conveying pressure difference dp_target.

To make this setting happen as quickly as possible, feed-forward control based on an inverse model 51 of the pump assembly is first provided. The description in DE 10 2019 210 003 A1 specifies mathematical formulas by means of which the behavior of a pump assembly in the form of an axial piston machine can be modeled. DE 10 2021 200 693 A1 specifies a method by which a mathematical model of an axial piston machine can be determined in an experimental manner. Common to all of these models is that, in the case of an inversion, they provide useful results only if the inputted temporal profile of the conveying pressure difference can in fact be set in a real pump assembly.

However, the target conveying pressure difference dp_target may have abrupt changes that cannot occur in the actual conveying pressure difference because the actual conveying pressure difference can change only continuously. Therefore, the target conveying pressure difference dp_target is first fed to a trajectory planning filter 50 before being fed to the inverse model 51 of the pump assembly. In the simplest case, a trajectory planning filter 50 is a low-pass filter with a fixed cut-off frequency. In this way, the discussed abrupt changes can be easily eliminated. However, preferably the trajectory planning filter 50 disclosed in DE 10 2019 210 003 A1 is used, by means of which the performance capability of the pump assembly can be optimally utilized so that, in the context of the feed-forward control, the target conveying pressure difference dp_target is approached particularly quickly.

Besides the modified target conveying pressure difference, the measured values from the sensors, namely the actual speed n of the drive shaft and the first and second actual pressures p_A; p_B, are also fed to the inverse model 51 of the pump assembly, for the calculation of the model 51. The inverse model 51 of the pump assembly provides as a result a target control pressure difference dpX_target which theoretically must be set in order to achieve the fastest possible approach of the actual conveying pressure difference toward the target conveying pressure difference dp_target. Of course, this theoretical value does not perfectly match the real circumstances. Therefore, closed-loop control 50 is superposed on the feed-forward control.

In the present case, the control variable of the controller 52 is a further target control pressure difference, which is additively superposed 54 with that of the feed-forward control in order to obtain dpX_target. It is conceivable that the control variable of the controller 52 starts at a suitable point of the inverse model 51 of the pump assembly in order to improve the control behavior.

First, on the input side of the controller 52 the actual conveying pressure difference is calculated 55 as the difference 53 between the first and second actual pressures p_A; p_B. The control deviation results from the difference 53 between the target conveying pressure difference dp_target and the actual conveying pressure difference. The control deviation is fed to the controller 52, which is preferably in the form of a continuous linear controller, in particular a PID regulator. The controller 52 is preferably calculated discretely in time.

Figure 3:
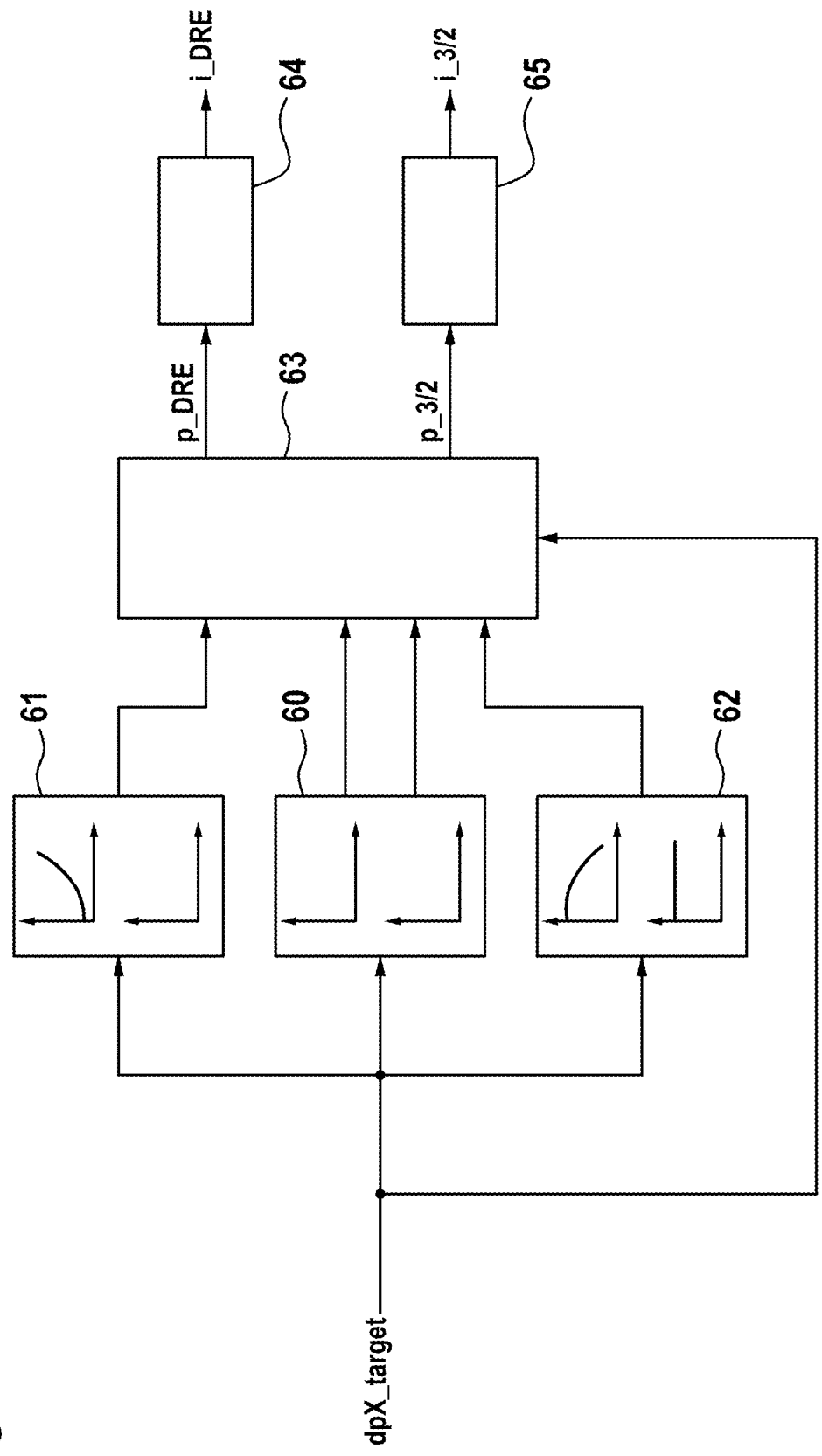
FIG. 3 another part of the control diagram from FIG. 2.

FIG. 3 shows another part of the control diagram from FIG. 2. The target control pressure difference dpX_target forms the interface of FIGS. 2 and 3.

In the context of the disclosure, particular control valves are used, namely a pressure control valve and a 3/2-way switching valve. This selection has considerable advantages in the case of a fan drive, because different fan variants common on the market can be realized with the same components. In particular, it can be freely selected on which side of the control cylinder the pressure control valve is to be arranged, with the 3/2-way switching valve being arranged on the other side. This advantage comes at the expense of the disadvantage that the control behavior of the control valves at a target control pressure difference dpX_target equal to zero has a significant discontinuity which relates to both control valves. Thus, with a conventional, purely hydraulic control device, the present control valves are not usable, even if they were hydraulically actuatable.

The mentioned discontinuity is taken into account by distinguishing three cases, namely a zero case 60, a positive case 61, and a negative case 62. In the zero case 60, the target control pressure difference dpX_target is essentially zero, and the cases in which, because of position inaccuracies, it is not certain whether the actual control pressure difference actually set is positive or negative are also to be included.

Figure 4:
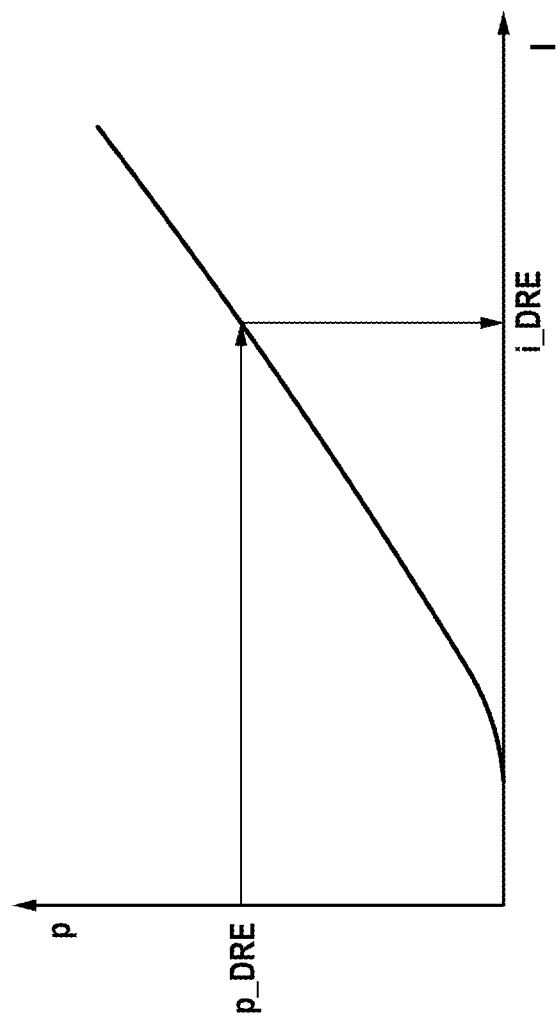
FIG. 4 a diagram illustrating the inverse model of the pressure control valve.

In the positive case 61, the target control pressure difference dpX_target is positive, and the zero case 60 is not present. In the positive case 61, the second control chamber is connected to the control return via the 3/2-way switching valve, so that in the second control chamber essentially the pressure of zero is present. In the case of the pressure control valve with positive characteristic curve shown in FIG. 1, the current i_DRE is thus approximately proportionally increased to the desired target control pressure difference dpX_target. The corresponding relationship is shown in FIG. 4.

In the negative case 62, the target control pressure difference dpX_target is negative, and the zero case is not present. In this case, the second control chamber is connected to the control supply via the 3/2-way switching valve, so that a high pressure is present in the second control chamber, this pressure simultaneously defining the maximum pressure that can be set with the pressure control valve. In the case of the pressure control valve with rising characteristic curve shown in FIG. 1, the current i_DRE is decreased approximately inversely proportionally to the magnitude of the desired target control pressure difference dpX_target.

In the zero case 60, two zero settings of the control valves (numbers 30; 32 in FIG. 1) are possible. Either both of the control chambers may be connected to the control supply or both of the control chambers (numbers 21; 22 in FIG. 1) may be connected to the control return. In both cases of the zero setting, an effective pressure of zero acts on the control piston. Theoretically, the pressure control valve must not be set to an intermediate value. However, this is unavoidable in practice, in particular when a transition from the positive case 61 to the negative case 62 or vice versa occurs (zero crossing). This problem is addressed by the fact that the corresponding switchover is carried out only when it is actually necessary, and it is then carried out particularly quickly.

For this purpose, preferably all four conceivable cases of the first and second control pressures p_DRE; p_3/2 are calculated continually and quasi-simultaneously or, in the case of the zero settings, provided as constants, wherein only in the context of a case differentiation 63 is it determined which of the four cases is used to control the control valves (numbers 30; 32 in FIG. 1).

This case differentiation 63 is simple when clearly the positive or negative case 61; 62 is present. It becomes more difficult when a zero crossing occurs. Here, it is conceivable that the target control pressure difference dpX_target is abruptly adjusted across zero. In this sub-case, the simple case differentiation of the positive and negative cases 61; 62 already leads to the desired result, wherein the discontinuity caused by the control system is not troublesome due to the discontinuous adjustment of the target control pressure difference dpX_target.

If the zero crossing takes place in the context of a continuous adjustment of the target control pressure difference dpX_target, it can be predicted when theoretically the zero crossing will take place by observing the derivative of the target control pressure difference with respect to time. Then, the zero setting that does not require an abrupt adjustment of the control valves is set a short period of time before the theoretical zero crossing. During the zero case 60, the target control pressure difference dpX_target is further observed. If the zero case 60 is clearly exited in the sense of a zero crossing, the other zero setting is abruptly set.

With the inverse model 64 of the pressure control valve, the first control current i_DRE required for setting the desired pressure is determined. This may be accomplished with the static model shown in FIG. 4, which is simply the valve characteristic curve. However, it is also conceivable that a dynamic model is used which takes into account how quickly the pressure control valve reacts to changes in the first control current i_DRE. Due to the particularly fast adjustment desired in the zero case 60, a dynamic inverse model 64 is advantageous.

The inverse model 65 of the 3/2-way switching valve is used to determine the second control current i_3/2 required to set the desired pressure. Due to the underlying switching characteristic, basically only two cases are to be differentiated here. In one case, i_3/2 equals zero. In the other case, i_3/2 is as large as possible without allowing overheating of the corresponding actuation solenoid (number 33 in FIG. 1). It is conceivable that a greater second control current i_3/2 is set during the switchover time period than in a later time period in which the 3/2-way switching valve is intended only to maintain its position. Firstly, a fast switchover can be achieved in this way, and secondly, the current consumption and the risk of overheating are minimized.

FIG. 4 shows a diagram illustrating the inverse model of the pressure control valve. It is a static model in the form of the valve characteristic curve.

On the horizontal axis the (average) current in the actuation solenoid is plotted, and on the vertical axis the pressure at the outlet of the pressure control valve is plotted. The pressure control valve is preferably designed to have at least a monotonic characteristic curve. This ensures that the model can be clearly inverted. If a first control pressure p_DRE is specified, there is only one single possible first control current i_DRE to be set for said first control pressure.

The present characteristic curve is approximately linear. In the context of the preferred digital control, the present approximation quality is readily sufficient, since the remaining non-linearity is compensated by the inverse model, without fear of technical disadvantages.

Figure 5:
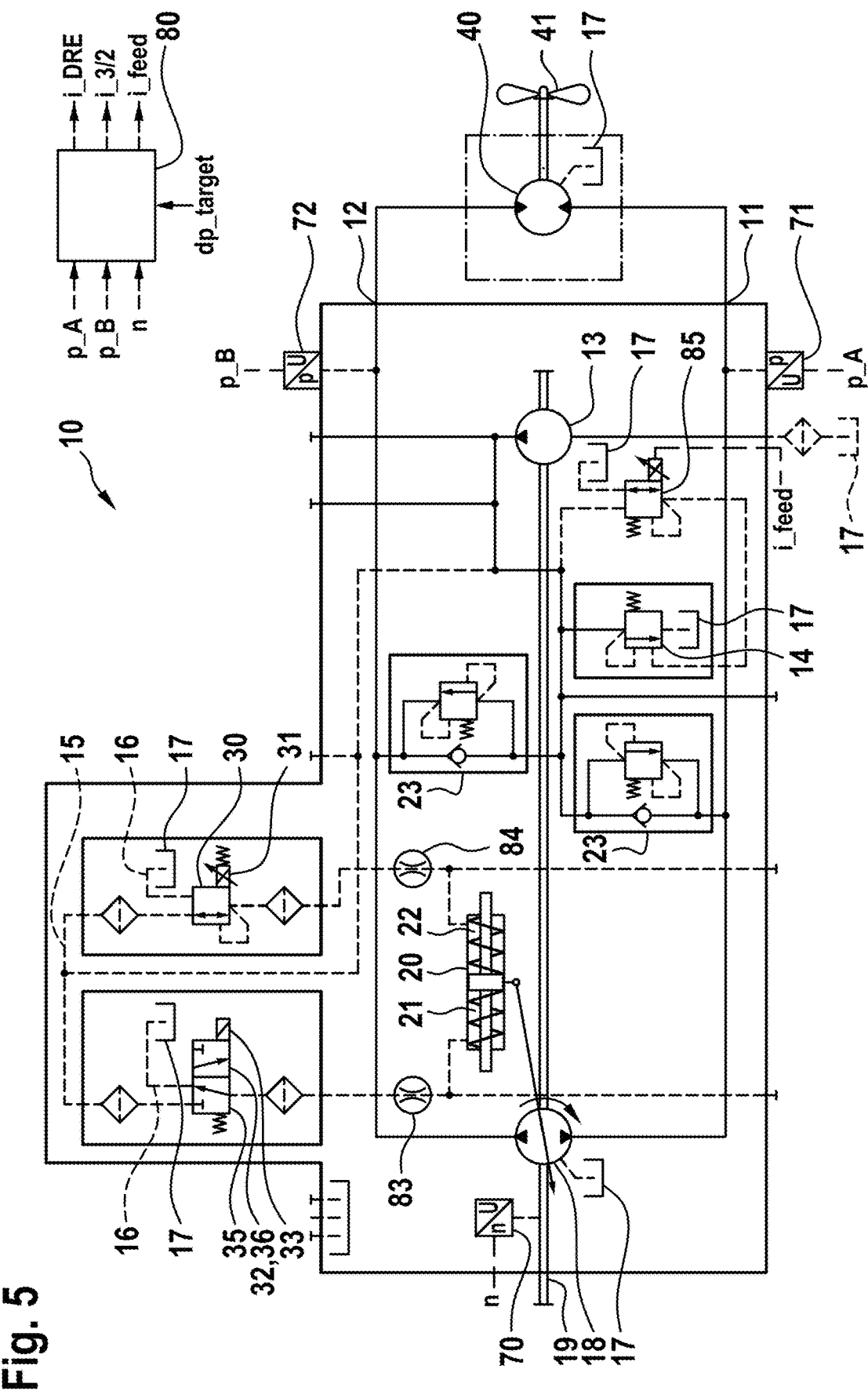
FIG. 5 a hydraulic circuit diagram of a pump assembly according to the disclosure according to a second embodiment, which hydraulic circuit diagram corresponds to FIG. 1.

FIG. 5 shows a hydraulic circuit diagram of a pump assembly 10' according to the disclosure according to a second embodiment, which hydraulic circuit diagram corresponds to FIG. 1. The second embodiment is identical to the first embodiment according to FIGS. 1 to 3 except for the differences described below, and therefore reference is made in this regard to the statements on FIGS. 1 to 3.

In the second embodiment, the pressure control valve 30 is associated with the second control chamber 22, with the 3/2-way switching valve 32 being associated with the first control chamber 21. Also, a pressure control valve 30 having a falling characteristic curve is used. In the currentless state, said pressure control valve connects the pressure in the control supply 15 to the second control chamber 22. To achieve the desired fail-safe behavior, the 3/2-way switching valve 31 is designed such that, in the currentless state, said 3/2-way switching valve connects the first control chamber 21 to the control return 16. In the currentless state, the first and second embodiments behave the same with respect to the direction of flow between the first and second working ports 11; 12, because in both cases the second control chamber 22 carries the higher pressure.

If, in the currentless state, one wishes to reverse the direction of flow between the first and second working ports 11; 12, the two control valves 30; 32 must be exchanged both in FIG. 1 and in FIG. 5, and the settings in the control device 80 are to be adapted accordingly. Here, use is made of the fact that the conveying direction of the pump assembly can be reversed merely by adjustment of the displacement volume.

In the second embodiment, the feed pressure limiting valve 14 can be electrically adjusted by means of a pilot valve 85. In the present case, the pilot valve 85 is in the form of an electrically adjustable pressure reducing valve, the outlet pressure of which acts on the spring counter side of the feed pressure limiting valve 14. Thus, the triggering pressure of the feed pressure limiting valve 14 decreases when the pressure at the outlet of pilot valve 85 increases. The pilot valve 85 is connected to the output side of the control device 80, and the corresponding third control current i_feed or the associated feed pressure is considered in the controlling of the pressure control valve 30 and of the 3/2-way switching valve 32.

Figure 6:
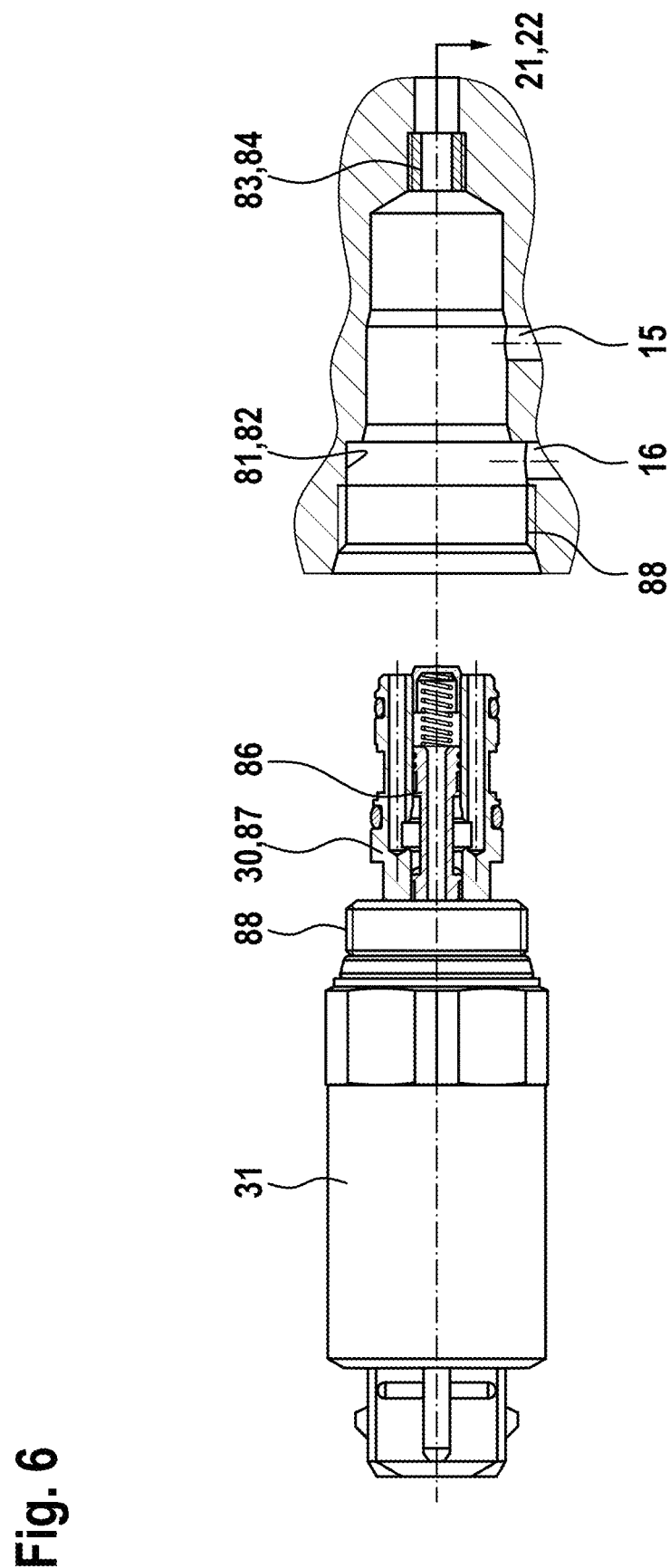
FIG. 6 a sectional view of the pressure control valve with the associated receiving bore.

FIG. 6 shows a sectional view of the pressure control valve 30 with the associated first or second receiving bore 81; 82. The pressure control valve 30 is the pressure reducing valve known from the data sheet "Proportional-Druckreduzierventil, direktgesteuert, steigende Kennlinie FTDRE 4 K" of Bosch Rexroth AG (order number RD58038; edition Feb. 2, 2022), which pressure reducing valve is usable in the context of the present disclosure, other types also being usable. This data sheet also shows the associated first or second receiving bore 81; 82 with all the dimensions required for manufacture. A 3/2-way switching valve is also available for this receiving bore.

The pressure control valve 30 comprises an actuation solenoid 31, which can apply an electrically adjustable magnetic force to the control slider 86 of the pressure control valve 30. The valve portion 87 of the pressure control valve 30 is fastened in the associated first or second receiving bore 81; 82, and in the present case is screwed 88 there.

The first and second throttles 83; 84 are preferably each in the form of a separate insert which is fixedly installed, in particular screwed, at the bottom of the first and second receiving bores 81; 82, respectively.

Finally, reference is made to a parallel patent application of the present patent applicant which has the same priority date and which relates to further details of the pump assembly according to the disclosure.

REFERENCE SIGNS

| | |
|---|---|
| 10 | Pump assembly (first embodiment) |
| 10' | Pump assembly (second embodiment) |
| 11 | First working port |
| 12 | Second working port |
| 13 | Feed pump |
| 14 | Feed pressure limiting valve |
| 15 | Control supply |
| 16 | Control return |
| 17 | Tank |
| 18 | Main pump |
| 19 | Drive shaft |
| 20 | Control cylinder |
| 21 | First control chamber |
| 22 | Second control chamber |
| 23 | Feed valve |
| 30 | Pressure control valve |
| 31 | Actuation solenoid of the pressure control valve |
| 32 | 3/2-way switching valve |
| 33 | Actuation solenoid of the 3/2-way switching valve |
| 34 | Restoring spring |
| 35 | First position |
| 36 | Second position |
| 40 | Hydraulic motor |
| 41 | Fan wheel |
| 50 | Trajectory planning filter |
| 51 | Inverse model of the axial piston machine |
| 52 | Controller |
| 53 | Target/actual value comparison |
| 54 | Superposition of feed-forward control and closed-loop control |
| 55 | Determination of the actual conveying pressure difference |
| 60 | Zero case |
| 61 | Positive case |
| 62 | Negative case |
| 63 | Case differentiation |
| 64 | Inverse model of the pressure control valve |
| 65 | Inverse model of the 3/2-way switching valve |
| 70 | Speed sensor |
| 71 | First pressure sensor |
| 72 | Second pressure sensor |
| 80 | Control device |
| 81 | First receiving bore |
| 82 | Second receiving bore |
| 83 | First throttle |
| 84 | Second throttle |
| 85 | Pilot valve of the feed pressure limiting valve |
| 86 | Control slider of the pressure control valve |
| 87 | Valve portion |
| 88 | Screw connection |
| dpX_target | Target control pressure difference |
| dp_target | Target conveying pressure difference |
| i_DRE | First control current |
| i_3/2 | Second control current |
| i_feed | Third control current |
| p_A | First actual pressure |
| p_B | Second actual pressure |
| n | Actual speed |
| p_DRE | First control pressure |
| p_3/2 | Second control pressure |

The invention claimed is:

1. A pump assembly comprising:
a first working port;
a second working port configured to be fluidically connected to at least one hydraulic motor in a closed hydraulic circuit;
a drive shaft configured such that, in a full revolution of the drive shaft, a displacement volume of pressurized fluid is conveyed between the first and second working ports;
a double-acting control cylinder via which the displacement volume is continuously adjustable, the double-acting control cylinder having a first control chamber and a second control chamber assigned, respectively, to a first receiving bore and a second receiving bore, which are permanently fluidically connected to the respective first and second control chambers, the first and second receiving bores each being of a common design and each being configured to receive a built-in valve;
a first pressure sensor configured to measure a first actual pressure at the first working port;
a second pressure sensor configured to measure a second actual pressure at the second working port;
an electrically adjustable pressure control valve installed in a first one of the first and second receiving bores;
an electrically adjustable 3/2-way switching valve installed in the other of the first and second receiving bores; and
a control device to which the first and second pressure sensors, the pressure control valve, and the 3/2-way switching valve are connected, the control device being configured to:
receive a target conveying pressure difference; and
control the pressure control valve and the 3/2-way switching valve to adjust the displacement volume in such a way that a difference between the first and second actual pressures approaches the target conveying pressure difference.

2. The pump assembly according to claim 1, wherein:
the control device is configured with a setting of which of the first and second receiving bores each of the pressure control valve and the 3/2-way switching valve is installed in, and
the control device is configured such that the setting is considered in the controlling of the pressure control valve and the 3/2-way switching valve.

3. The pump assembly according to claim 1, further comprising:
a speed sensor configured to measure an actual speed of the drive shaft,
wherein the control device is configured such that, in the controlling of the pressure control valve and the 3/2-way switching valve, only the actual speed and the first and second actual pressures are considered as actual values measured during operation.

4. The pump assembly according to claim 1, wherein the control device implements feed-forward control on which closed-loop control is superposed.

5. The pump assembly according to claim 1, wherein:
the control device configured with a second setting of whether the pressure control valve actually used has a rising or a falling characteristic curve, and
the control device is configured such that the second setting is considered in the controlling of the pressure control valve.

6. The pump assembly according to claim 1, wherein:
the 3/2-way switching valve is biased into a first position by a restoring spring and is configured to be switched into a second position by an associated actuation solenoid,
the associated first or second control chamber is selectively fluidically connectable either to a control supply or to a control return by switching of the 3/2-way switching valve,
the control device is configured with a third setting whether the 3/2-way switching valve actually used establishes a fluidic connection between the associated first or second control chamber and the control supply or the control return when said 3/2-way switching valve is in a first position, and the control device is configured such that the third setting is considered in the controlling of the 3/2-way switching valve.

7. The pump assembly according to claim 1, wherein the pressure control valve has a rising characteristic curve, and the 3/2-way switching valve establishes a connection to a control supply when said 3/2-way switching valve is in a first position.

8. The pump assembly according to claim 1, wherein the pressure control valve has a falling characteristic curve, and the 3/2-way switching valve establishes a connection to a control return when said 3/2-way switching valve is in a first position.

9. The pump assembly according to claim 1, further comprising:

a feed pump, which has a drive connection to the drive shaft and which is fluidically connected, on an outlet side, to a control supply; and a feed pressure limiting valve configured to set a pressure in the control supply, wherein the control device is configured such that the setting of the feed pressure limiting valve is considered in the controlling of the pressure control valve and the 3/2-way switching valve.

10. The pump assembly according to claim 1, wherein at least one of the first control chamber and the second control chamber is permanently fluidically connected to the associated first or second receiving bore via a respectively associated first or second throttle.

11. The pump assembly according to claim 1, wherein the displacement volume is continuously adjustable such that a direction of the fluid flow between the first and second working ports is reversible by adjustment of the control cylinder, while a rotation direction of the drive shaft remains constant.

* * * * *